US005495357A

United States Patent [19]
Osterhout

[11] Patent Number: 5,495,357
[45] Date of Patent: Feb. 27, 1996

[54] APPARATUS AND METHOD FOR RECORDING, TRANSMITTING, RECEIVING AND PLAYING SOUNDS

[75] Inventor: Ralph F. Osterhout, San Francisco, Calif.

[73] Assignees: Machina, Inc., San Francisco; Kid One For Fun, Inc., San Anselmo, both of Calif.

[21] Appl. No.: 196,326

[22] Filed: Feb. 14, 1994

[51] Int. Cl.$^6$ .................................. H04B 10/00
[52] U.S. Cl. .................. 359/152; 359/143; 359/150; 455/66; 369/6; 340/825.15; 340/825.72; 381/172
[58] Field of Search .................. 359/142–143, 359/145–150, 152; 381/172; 455/66, 93, 95, 344, 89; 379/85, 67, 58; 340/825.15, 825.24, 825.25, 825.44, 825.72; 369/6; 360/7, 55; 365/45

[56] References Cited

U.S. PATENT DOCUMENTS

| | | | |
|---|---|---|---|
| 4,356,519 | 10/1982 | Cogdell, Jr. | 340/825.44 |
| 4,426,738 | 1/1984 | Sato | 359/147 |
| 4,500,752 | 2/1985 | Lee | 379/85 |
| 5,081,668 | 1/1992 | Ito | 379/58 |
| 5,142,564 | 8/1992 | Chu | 379/67 |

FOREIGN PATENT DOCUMENTS

| | | | |
|---|---|---|---|
| 0457492 | 11/1991 | European Pat. Off. | 369/6 |
| 3733415 | 4/1989 | Germany | 369/6 |

*Primary Examiner*—Leo H. Boudreau
*Assistant Examiner*—Kinfe-Michael Negash
*Attorney, Agent, or Firm*—Skjerven, Morrill, MacPherson, Franklin & Friel; Alan H. MacPherson; Omkar K. Suryadevara

[57] ABSTRACT

A compact solid state representative communication device allows the user to record, transmit, receive, play and erase messages or sounds. The communication device includes a record switch for recording messages to be sent, a transmit switch for sending messages, a play switch for playing recorded and received messages, a microphone for converting sound waves into electrical signals indicative of sound waves, an audio recorder for recording and playing back electrical signals indicative of sound waves, a transmitter for transmitting electromagnetic signals (preferably but not necessarily IR signals) indicative of sound waves, a receiver for receiving electromagnetic signals indicative of sound waves and a speaker for converting electrical signals into sound waves, all encased in a single compact housing. The communication device is small enough and light enough to be worn on the clothing of a person.

8 Claims, 10 Drawing Sheets

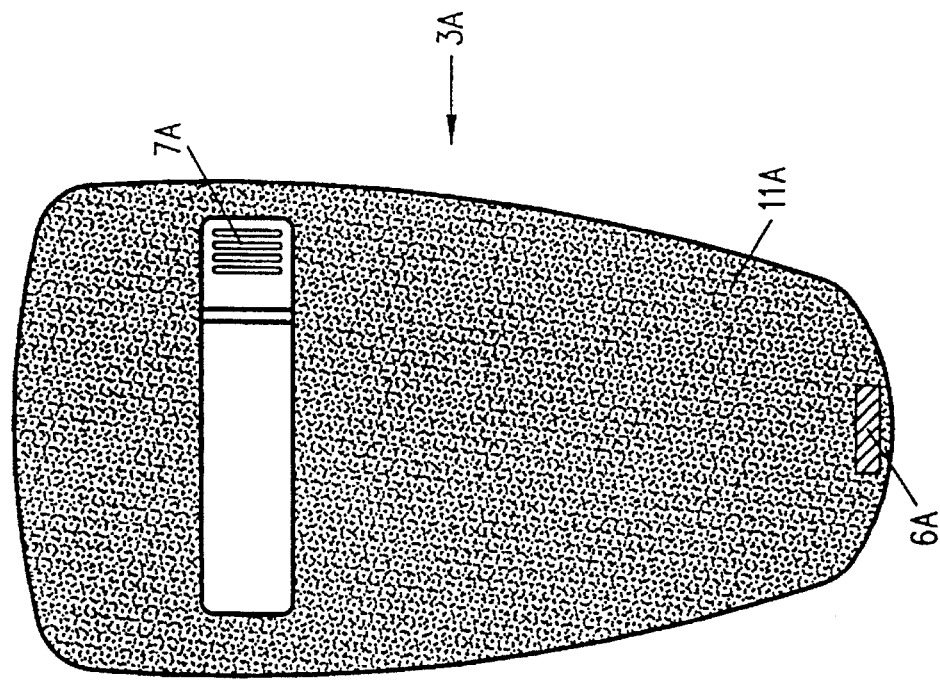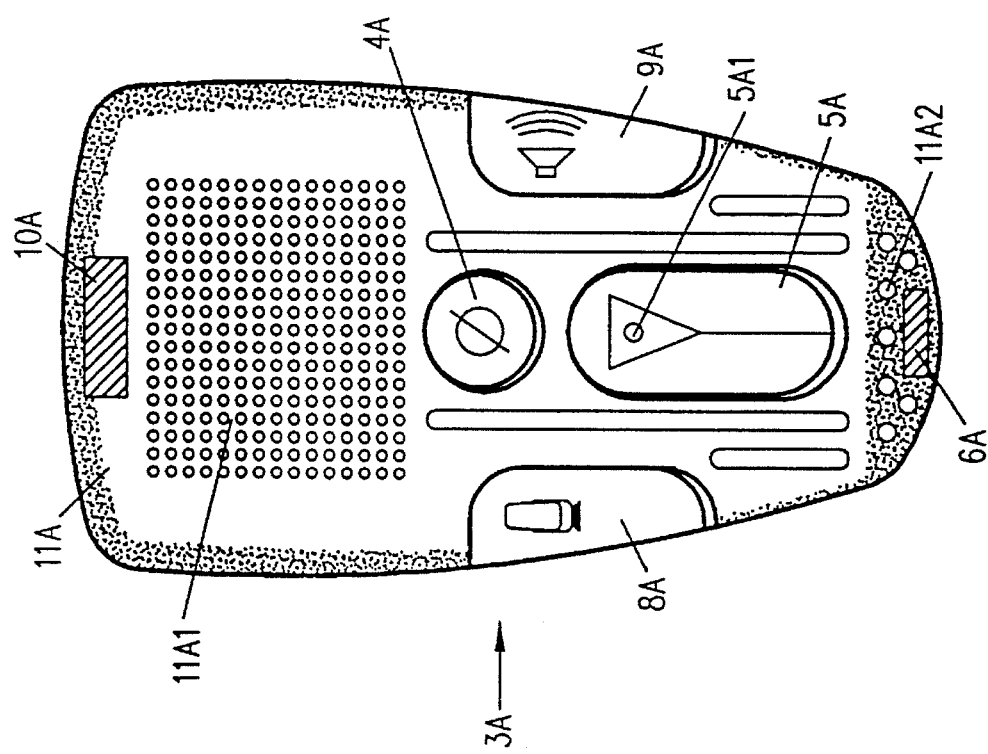

5,495,357

APPARATUS AND METHOD FOR RECORDING, TRANSMITTING, RECEIVING AND PLAYING SOUNDS

FIELD OF THE INVENTION

This invention relates to a compact solid state interactive communication device that allows the user to record, transmit, receive and play sounds. More particularly this invention relates to a compact solid state interactive device that includes a solid state direct analog storage audio recorder, an infrared receiver and an infrared transmitter all encased in a single compact housing.

BACKGROUND OF THE INVENTION

In today's hide and seek games, persons such as children can use toy laser guns that send and receive infrared signals. Most such toys produce a laser gun sound effect and send an infrared beam when the gun's trigger is depressed. If the infrared beam is received by photo-receptors of a remote toy, lights flash and a beep goes off indicating a hit.

However, it is not known for toy laser guns to record messages of voice and/or sound effects and to send or receive voice and/or sound effects. To record messages, a person can use conventional audio recorders typically sized to be held in a human hand. The smallest size achievable by such recorders is limited by the physical dimensions of an audio-cassette tape traditionally included in such recorders. To send messages, a person can use two way wireless sets, typically strapped over the person's back or held in the person's hand. Although wireless microphone transmitters are known in the prior art, such transmitters merely transmit radio signals representive of sound waves and cannot be used to receive signals. Also known in the art are wireless receiver headphones that a person can use to listen to sounds derived from radio broadcasts or compact discs or tapes. However, such headphones merely receive infrared signals representative of sound waves and cannot be used to transmit signals.

SUMMARY OF THE INVENTION

In accordance with this invention, a compact solid state interactive communication device allows the user to record, play and erase messages or sounds. The communication device also permits the person to wirelessly transmit and receive previously recorded messages and sounds to/from another such device.

In one embodiment the communication device includes a record switch for recording messages to be sent, a transmit switch for sending messages, a play switch for playing recorded and received messages, a microphone for converting sound waves into analog electrical signals representative of sound waves, a direct analog storage audio recorder, preferably but not necessarily solid state, for recording and playing back electrical signals representative of sound waves, a transmitter, preferably but not necessarily, of infrared signals for transmitting signals representative of sound waves, a receiver, preferably but not necessarily of infrared signals, for receiving signals representative of sound waves and a speaker for converting analog electrical signals into sound waves, all encased in a single compact housing. The communication device is small enough and light enough to be worn on the clothing of a person. In one embodiment the communication device includes one or more sound effects switches that can record, play and add to a message being recorded already pre-recorded sound effects selected by the person.

In the preferred embodiment, the communication device is clipped onto the user's lapel, belt or pocket or worn by the user on a chain around the user's neck. Messages can be transmitted to and received by a communication device without the user of that device being aware of such receipt until receipt of the message is completed and further without the user being aware of the source of the message. The communication device has several modes of operation; namely record, transmit a recorded message to another communication device, play a recorded message and receive and record a message transmitted from another communication device. The received and/or recorded message can be listened to by the user at any convenient time.

This invention will be more fully understood in view of the detailed description taken together with the drawings.

BRIEF DESCRIPTION OF THE DRAWINGS

FIGS. 2A and 2B are the front elevation and back elevation views of a communication device in accordance with this invention.

DETAILED DESCRIPTION

Figure 1:
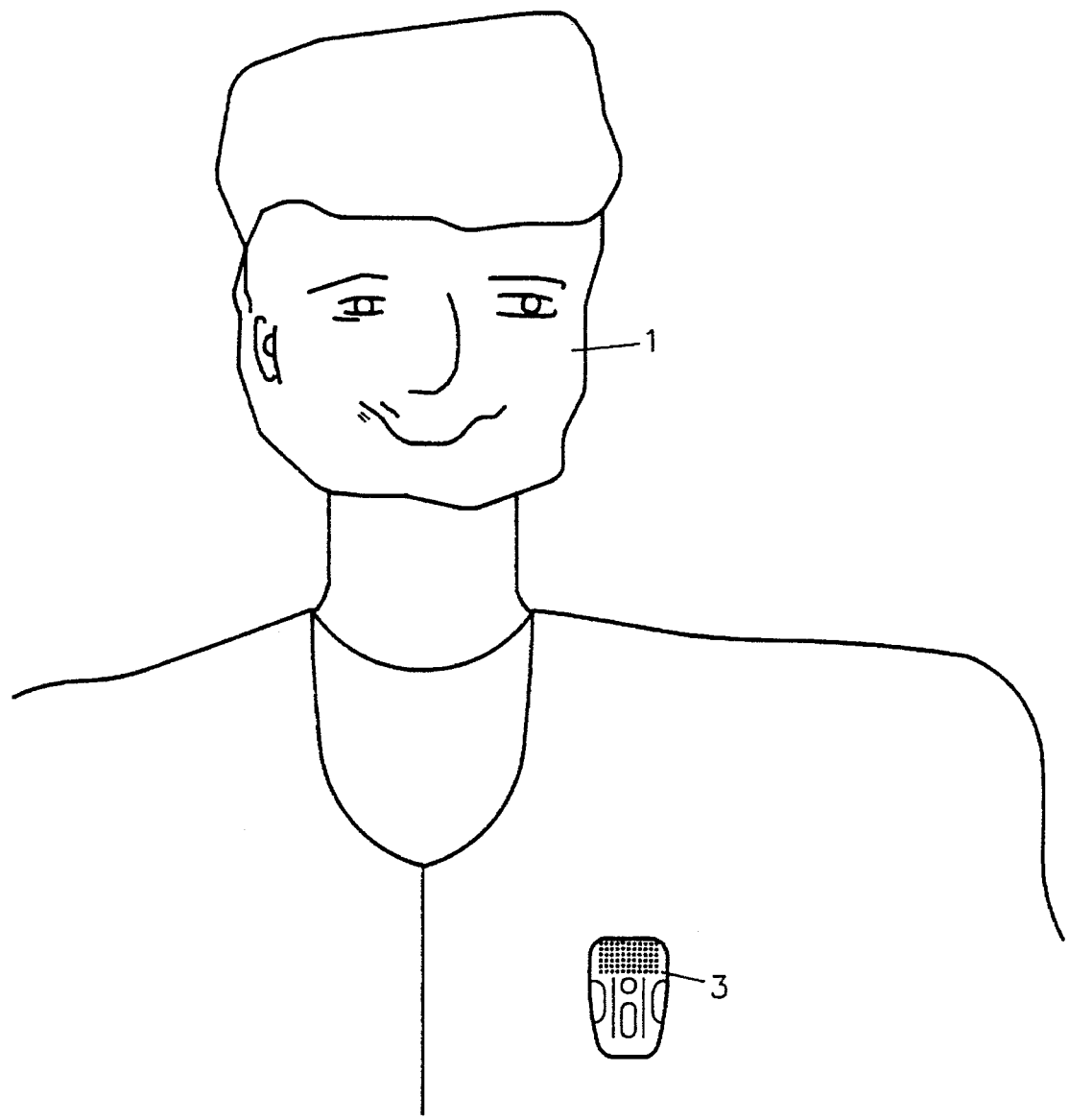
FIG. 1 is a perspective view of a person wearing one embodiment of a communication device in accordance with this invention.

FIG. 1 is a perspective view of a person 1 wearing a communication device 3 in a shirt pocket. In accordance with this invention, communication device 3 can be stored or carried on any part of a person's body.

FIGS. 2A and 2B show the front elevation and back elevation views of one embodiment of a communication device 3A in accordance with this invention. As shown in FIG. 2A, communication device 3A has: a record switch 8A for recording messages to be sent, an erase switch 4A for erasing recorded messages, a play switch 9A for playing recorded and received messages and a transmit switch 5A for sending recorded messages. Messages stored, transmitted, received and played by one embodiment of a communication device include sounds of any type (such as, for example, voice sounds, artificial sounds and natural sounds). Also provided in communication device 3A are a transmit indicator light emitting diode (henceforth "LED") 5A1, a transmit window 6A and a receive window 10A. All the above components of communication device 3A are encased in a compact housing 11A. Housing 11A is typically plastic and includes a speaker grille 11A1 for a speaker (not shown in FIGS. 2A and 2B), a microphone opening 11A2 for a microphone (not shown in FIGS. 2A and 2B) and a clip 7A for wearing device 3A on the clothing (for example, on a lapel or pocket) of a person.

Figure 2C:
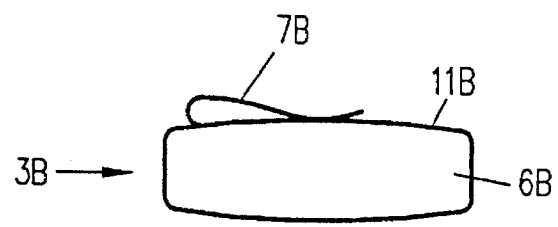
FIGS. 2C and 2D are the plan and front elevation views of another embodiment of a communication device in accordance with this invention.
Figure 2D:
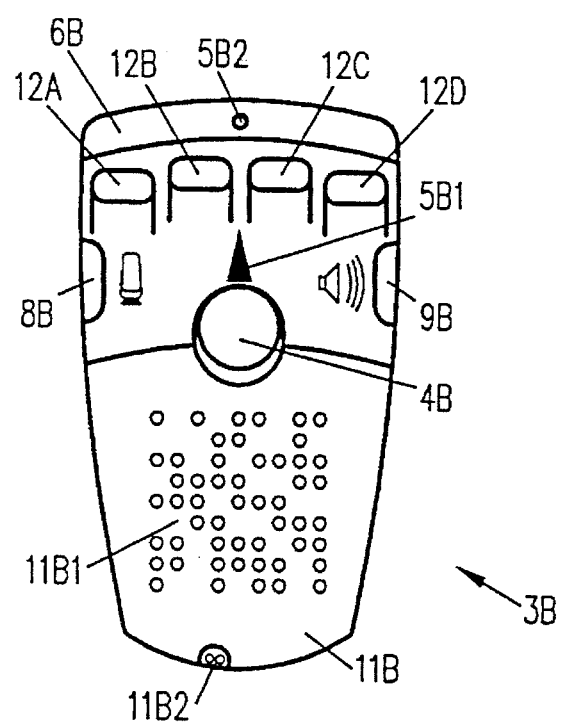

FIGS. 2C and 2D are the plan and front elevation views of another embodiment of a communication device 3B in accordance with this invention. Communication device 3B is similar to communication device 3A of FIGS. 2A and 2B. Communication device 3B also has a record switch 8B, a play switch 9B, a transmit switch 4B, a transmit indicator LED 5B1, a transmit window 6B (that also serves as a receive window), a housing 11B with a speaker grille 11B1, a microphone opening 11B2 and a clip 7B.

Furthermore, communication device 3B has a record/message indicator LED 5B2 to indicate receipt of a message or to indicate recording in progress. Communication device 3B also has sound effect switches 12A, 12B, 12C and 12D to record, to playback and to add to a message, sounds selected by a person. Sound effects can include, for example, sounds of "Oink Oink Oink" recorded from a real pig, "Quack Quack Quack" recorded from a real duck, other sounds recorded from a radio or television show or even sound effects created by the user (including special personalized messages).

Figure 2E:
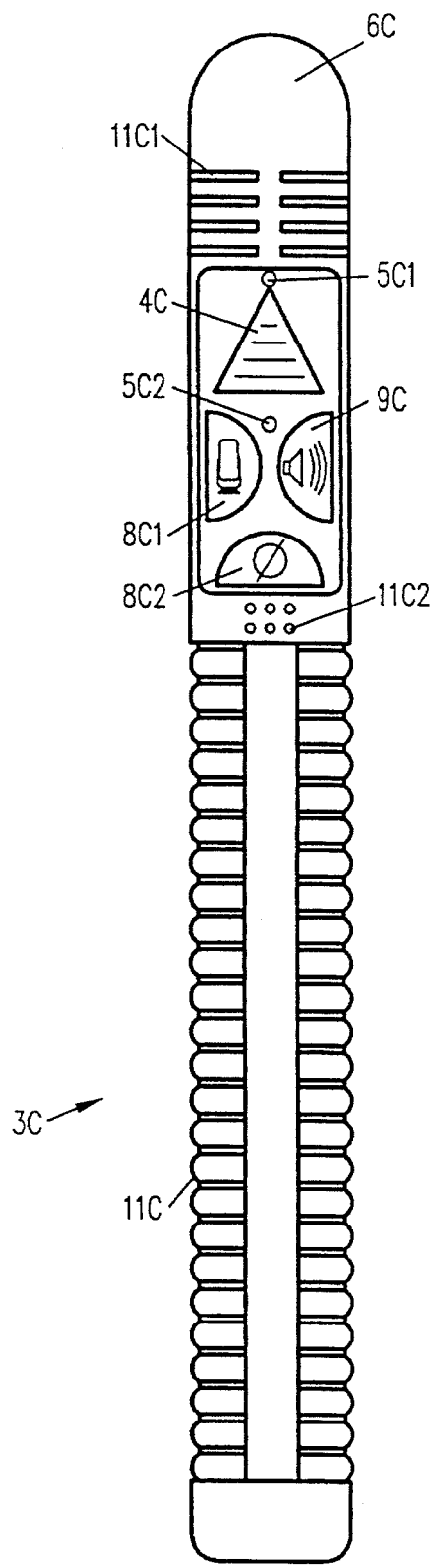
FIGS. 2E and 2F are the rear and front elevation views of another embodiment of a communication device in accordance with this invention.
Figure 2F:
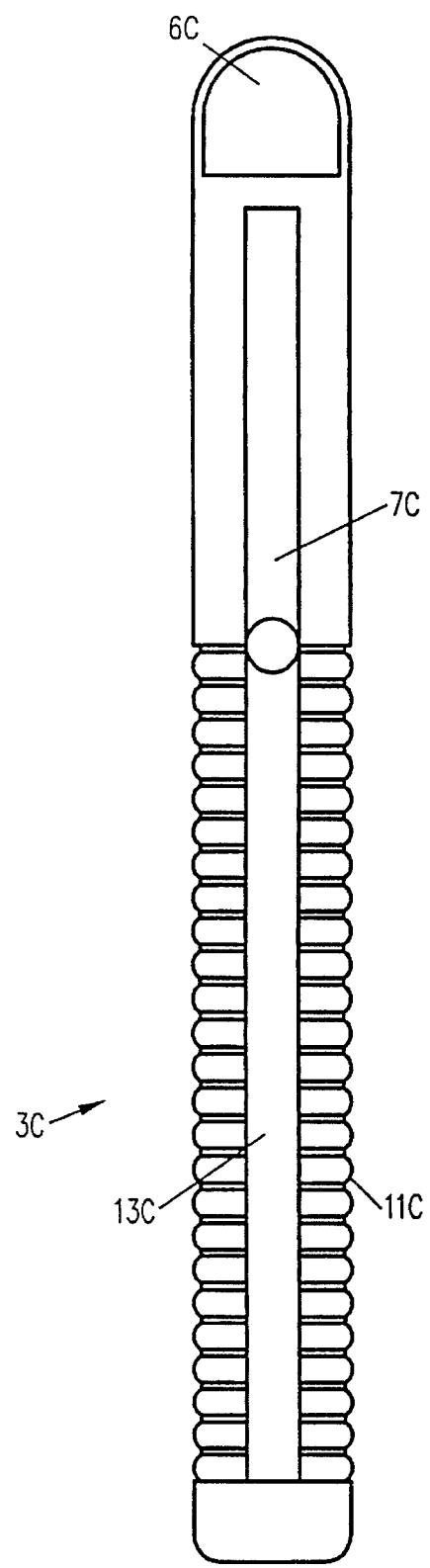

FIGS. 2E and 2F are the rear and front elevation views of another embodiment of a communication device 3C in accordance with this invention. Communication device 3C is similar in function to communication device 3A of FIGS. 2A and 2B but has a substantially different more slender appearance similar to a pen. Communication device 3C also has a record switch 8C1, a play switch 9C, a transmit switch 4C, a transmit indicator LED 5C1, a transmit window 6C (that also serves as a receive window), a housing 11C with a speaker grille 11C1, a microphone opening 11C2 and a clip 7C.

Furthermore, communication device 3C has a record/message indicator LED 5C2 to indicate receipt of a message or to indicate recording in progress. Communication device 3C also has an erase switch 8C2 for erasing a message stored in device 3C. The housing 11C of device 3C is shaped and sized in the form of a typical pen. As shown in FIG. 2F, a battery compartment 13C is provided for holding two AAA type batteries required to power device 3C.

Although three embodiments of a communication device are shown in FIGS. 2A to 2F, a communication device in accordance with this invention can be of any desired and appropriate shape or size. Although in the embodiments shown in FIGS. 2A to 2F, push activated switches are shown, other suitable types of electrical switches such as sliding switches may be used in accordance with this invention. Although in the above embodiments, certain configurations of the transmit and receive windows are shown, other configurations can be used. For example, multiple receive windows can be provided to receive signals from the front and sides of a communication device.

The interactive communication device of this invention has many novel features and advantages. The representative communication device provides fun in a personal way by allowing a user to transmit messages in the user's own voice (with optionally interspersed sound effects in some embodiments). Also, the communication device is light enough and small enough to be worn on the clothing or around the neck of a person. Furthermore, the communication device is "idiot proof" due to its basic repertoire of only a few controls: record, play and transmit (with optional erase in some embodiments).

Figure 3A:
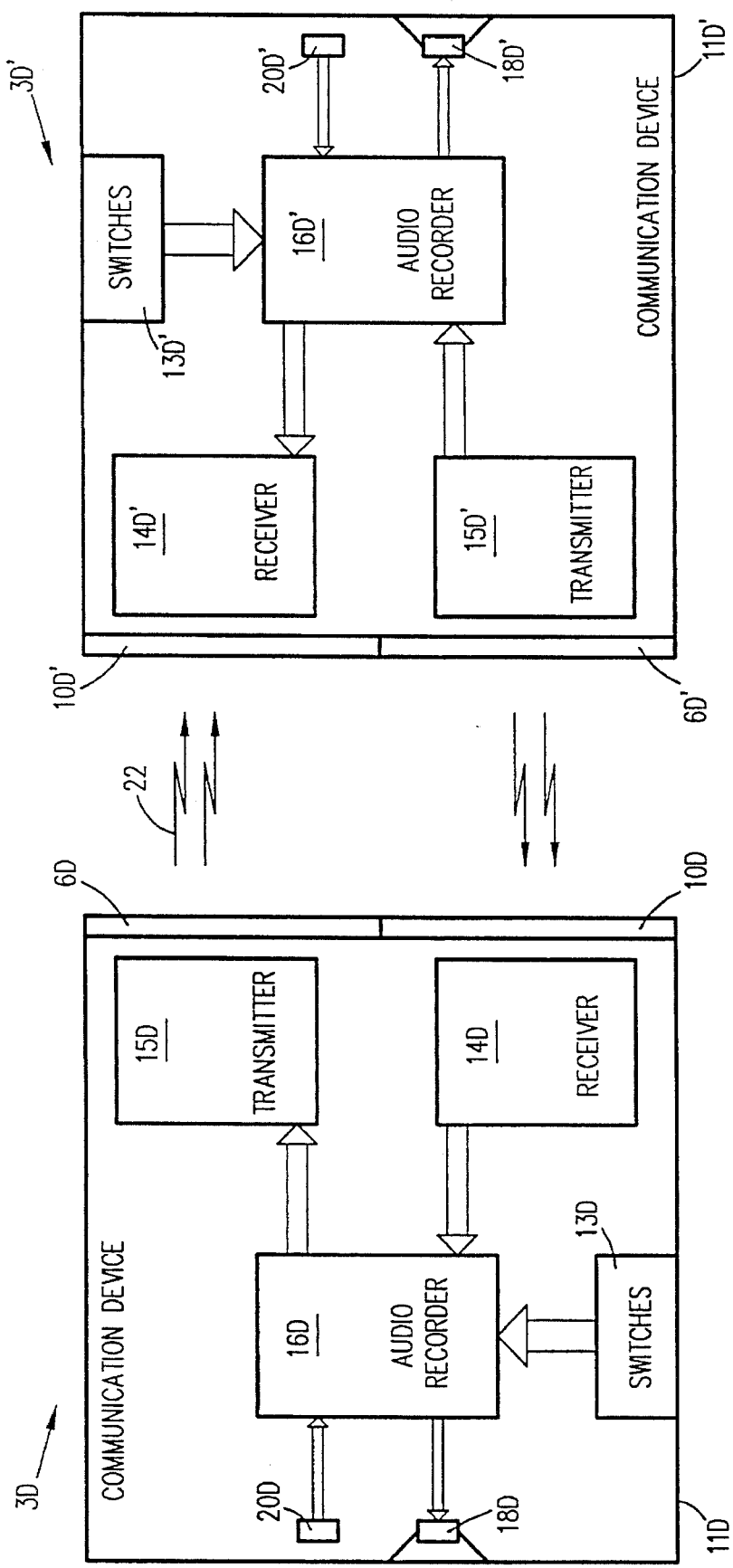
FIG. 3A is a high level block diagram of two communication devices being used in accordance with the present invention.

FIG. 3A is an illustrative high level block diagram of two identical communication devices 3D and 3D' being used in accordance with this invention. Communication devices 3D and 3D' are identical in structure and can be any of the above-described embodiments 3A, 3B and 3C or any other embodiment. Although communications devices 3D and 3D' are identical in structure, device 3D' is shown in FIG. 3A in an inverted orientation with respect to device 3D for convenience. As shown in FIG. 3A, communication devices 3D and 3D' include transmitters 15D and 15D' for transmitting electromagnetic signals (preferably but not necessarily IR signals) indicative of sound waves through transmit windows 6D and 6D', receivers 14D and 14D' for receiving electromagnetic signals indicative of sound waves through receive windows 10D and 10D', audio recorders 16D and 16D' for recording and playing back electrical signals (typically analog but also capable of being digital with appropriate A/D and D/A circuitry) indicative of sound waves, sound output transducers 18D and 18D' (such as, for example, loudspeakers) for converting analog electrical signals indicative of sound into corresponding sound waves and sound input transducers 20D and 20D' (such as, for example, microphones) for converting sound waves into analog electrical signals indicative of incident sound waves. Also, communications devices 3D and 3E have switches 13D and 13E that include record switches, play switches, transmit switches and optional erase switches (not shown in FIG. 3A).

In accordance with this invention, the user of communication device 3D can create a message to be sent to a remote device by using a record switch (one of switches 13D) to record sounds. When the record switch is depressed and continuously held down, any sounds impinging on a microphone opening (not shown in FIG. 3A) are converted by sound input transducer 20D into analog electrical signals and are stored in audio recorder 16D. Recording of the message stops when record switch 8D is released. When record switch 8D is held down during message recording, a message cannot be received from a remote communication device.

In some embodiments, a user can start a message with or add to an already recorded message, a pre-recorded sound effect. The user can push and release a sound effect switch (such as, for example, one of switches 12A to 12D of device 3B of FIGS. 2C and 2D) so that a sound effect already pre-recorded in device 3B corresponding to the sound effect switch hit by the user is added to a message (to be recorded or already recorded). A sound effect switch can be pushed and released as often as desired to add to the message a sound effect of any desired length. A sound effect can be pre-recorded into a communication device (such as, for example, device 3B of FIGS. 2C and 2D) by pushing and continuously holding down a selected sound effect switch so as to record any sounds impinging on a microphone opening. No sound effect is recorded initially for a short period of time (for example, one or two seconds) when a sound effect switch is continuously held down to distinguish the function of sound effect pre-recording from the function of adding a sound effect to a message.

In some embodiments of a communication device (such as, for example, communication devices 3B and 3C of FIGS. 2C, 2D, 2E and 2F), a record LED (such as, for example, LED 5B2 and LED 5C2) glows continuously to indicate message recording in progress. A record LED stops glowing to indicate no recording of a message when a record switch (such as, for example, switch 8B of device 3B of FIG. 2D) is released. In embodiments of a communication device having sound effects switches and a record LED (such as, for example, device 3B of FIG. 2D), the record LED also glows to indicate a sound effect being added to a message.

In accordance with this invention, to continue recording a message, a record switch 8A (of device 3A of FIG. 2A) can be used as often as desired. In embodiments with sound effects switches (such as, for example, device 3B of FIG. 2D), the record switch can be used to continue a message after addition of sound effects. When the user has finished recording, the user can press a play switch (such as, for example, play switch 9A of device 3A of FIG. 2A) to hear the recorded message. The play switch can be repeatedly pushed to hear a recorded message as often as desired. Once a play switch has been pushed, recording of a message cannot be continued. Using a record switch after use of the play switch causes an already recorded message to be erased so that a new message can be recorded (except in embodiments provided with an erase switch, in which case use of a record switch continues the recorded message and the message is erased only on hitting the erase switch).

To transmit a message recorded in a communication device, a user can aim the transmit window (such as, for example, window 6D of device 3D of FIG. 3A) at the receive window of a remote communication device (for example, device 3D with window 10D'). If the person with remote device 3D' is not facing the user, the user can aim the transmit window at a wall in front of or to the side of the person such that infrared signals emitted by device 3D "bounce" off the wall to reach device 3D'.

Referring to FIG. 3A, when the user pushes and holds down a transmit switch (one of switches 13D), a transmit LED (not shown in FIG. 3A) glows and electrical signals representative of a message stored in audio recorder 16D are transferred to transmitter 15D which transmits electromagnetic signals 22 representative of the sound message. In some embodiments, the transmit LED glows for as long as a message is being transmitted and stops glowing when message transmission is completed. During message transmission, a user must keep the communication device aimed at the remote device or in a fashion so that the remote device receives a reflected signal until message transmission is completed. During message transmission, a message cannot be received from a remote communication device. Although in the embodiment described above the message transmission is done in real times, in other embodiments the message is compressed and transmitted in a burst.

Electromagnetic signals 22 can be received by receiver 14D' of communication device 3D' if the receive window 10D' is properly oriented to receive the electromagnetic signals. On receipt of signals 22, receiver 14D' converts the received signals into electrical signals indicative of the sound message. These electrical signals are stored by audio recorder 16D' and one or two "beep" sounds are emitted by speaker 18D' to indicate receipt of a message. In some embodiments, an LED (such as, for example, LED 5B2 of device 3B of FIG. 2C also used for indicating recording of a message) will flash periodically (for example, once a second) to provide additional or alternate indication of receipt of a message. When the user presses play switch 9D', audio recorder 16D' transfers the analog electrical signals to sound output transducer 18D' which converts the electrical signals into sound waves. A user can press a play switch (one of switches 13D') to hear the received message as often as desired. Using a record switch (one of switches 13D') after receipt of a message causes the received message to be erased so that a new message can be recorded. Thus a received message can be erased even without playback of the message by using the record switch.

Figure 3B:
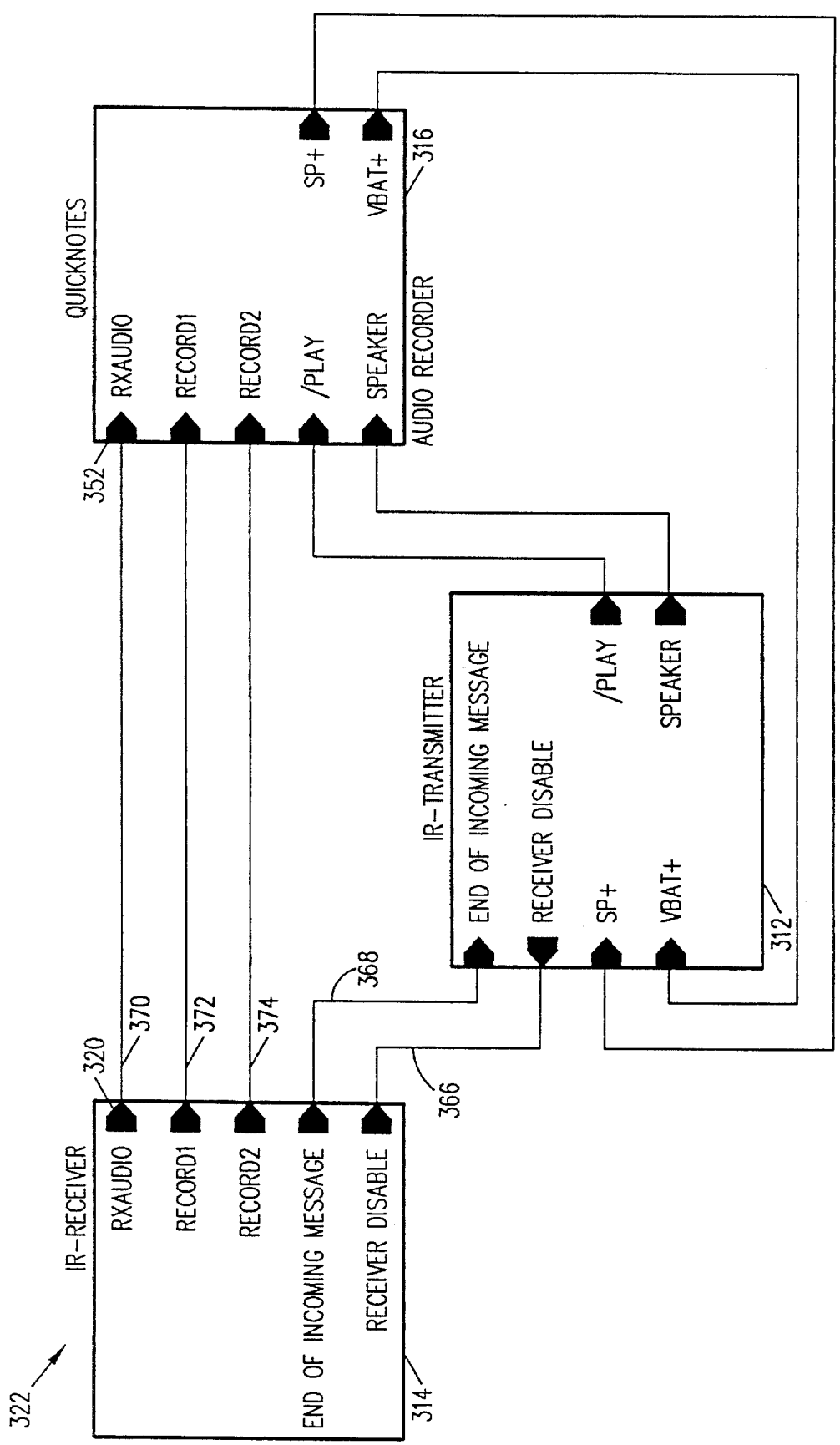
FIG. 3B is a low level block diagram of a communication device in accordance with this invention.

FIG. 3B illustrates in block diagram form the internal circuitry of a communication device such as, for example, 3D or 3D' shown in FIG. 3A. In FIG. 3B element 314 is an infrared (henceforth "IR") receiver, element 312 is an IR transmitter and element 316 is an audio recorder. While IR is used for transmitting signals in the preferred embodiment, other electromagnetic energy could also be used if desired. For example, collimated light could be used (of course the secrecy of transmission is then potentially lost) as well as other frequencies of electromagnetic radiation including radio frequencies.

In FIG. 3B, IR receiver 314 receives an IR signal 322 and converts this signal into an electrical signal which is transmitted by the RX audio output pin 320 on wire 370 to audio recorder 316. This electrical signal is received on RX audio input 352 of audio recorder 316 and recorded within audio recorder 316 in a manner well known in the art. For example, see the ISD chip specification describing the ISD 1000 Series to the ISD 2500 Series of products (including ISD addressable memory chips, such as, for example, ISD 1420) available from Information Storage Devices, 2841 Junction Avenue, San Jose, Calif. 95134.

To initiate recording in audio recorder 316, IR receiver 314 produces a control signal which is transmitted from receiver 314 to recorder 316 on lead 372. Shown in FIG. 3B are two wires 372 and 374 for transmitting control signals from receiver 314 to recorder 316. A start control signal is transmitted from RECORD 1 pin on receiver 314 to RECORD 1 pin on audio recorder 316 by a lead 372 while a second control signal is provided from receiver 314 RECORD 2 pin on lead 374 to RECORD 2 pin on audio recorder 316. The second control signal is provided because recorder 316 in one embodiment may require a second level control signal not available on lead 372. However, in general only one control lead is required between receiver 314 and recorder 316.

Lead 366 entitled RECEIVER DISABLE to receiver 314 from transmitter 312 disables the receiver during the transmission of signals from the device on IR transmitter 314. The signal labelled END OF INCOMING MESSAGE provides a pulse to the transmitter 312 upon the termination of an incoming message to allow the transmitter 312 to again transmit the signal and to activate a beep to inform the wearer of the device that a message has been received. The beep typically is an 800-cycle pulse with a duration of about one second. Of course, other appropriate frequencies and durations could be used as desired. In addition, the end of incoming message signal received by transmitter 312 causes an LED to start blinking. The LED will blink for about ¼ to ½ second, every 2 seconds, until the message is played back. Naturally, the light could have a different duration and a different frequency as desired.

Further, in FIG. 3B, VBAT+ is a direct connection from battery to the transmitter 312 to avoid stressing a regulator circuit during the transmission of messages by the device. The SP+ signal is the positive signal wire to the speaker. The SP+ wire goes through transmitter 312 which has a switch which opens the SP+ circuit during the transmission of signals to prevent the speaker from reproducing the message during the transmission of the message. This saves power and prevents disruption of meetings while a person using the device is transmitting a message. In fact, this particular switch prevents what is intended to be a covert message from becoming overt.

Figure 4:
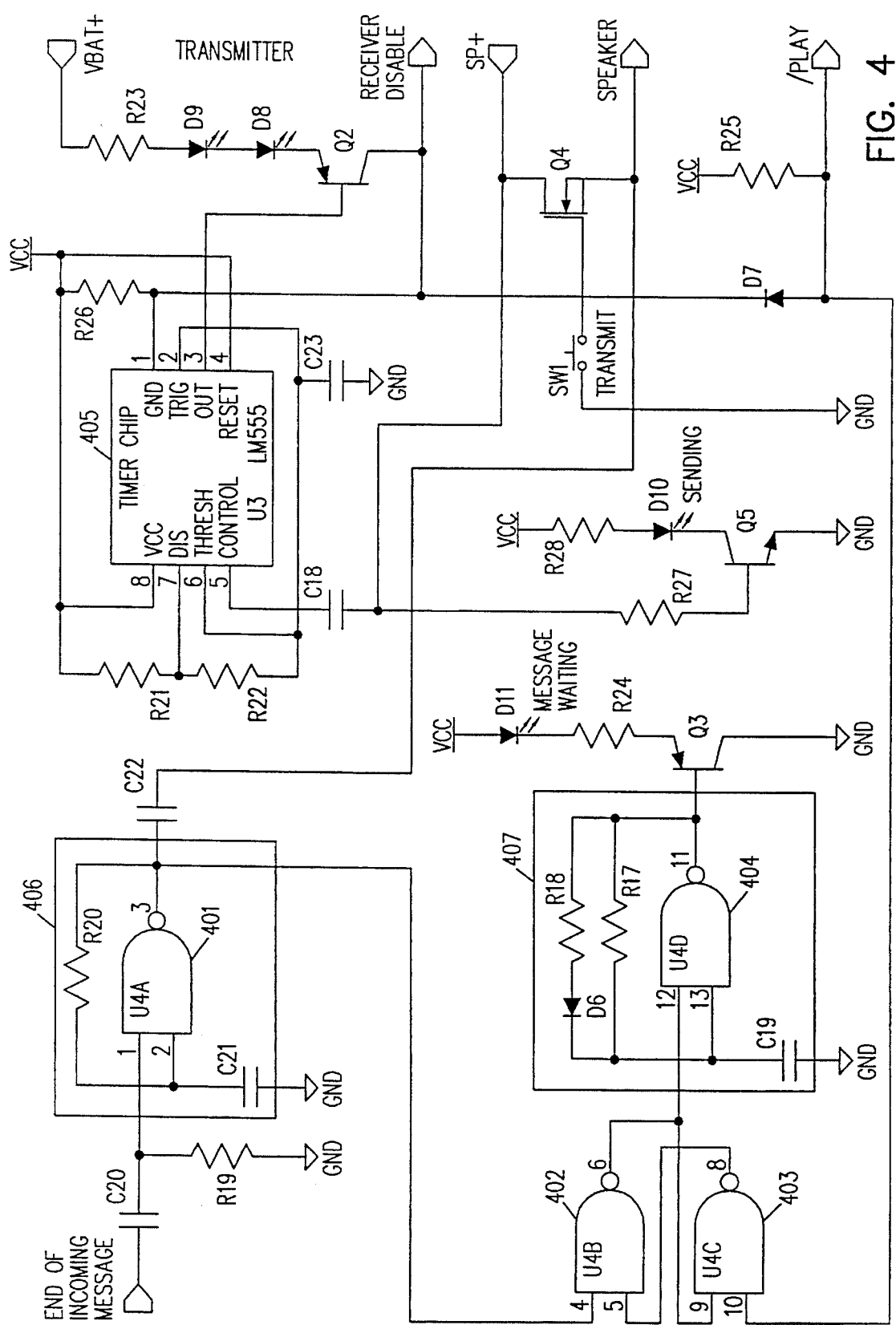
FIG. 4 is a circuit diagram of the infrared transmitter of FIG. 3B.

FIG. 4 illustrates a transmitter used in one embodiment of this invention. In FIG. 4, when it is desired to transmit a signal to some other like device, the person wearing the device presses the transmit switch SW1 thereby grounding the RECEIVER DISABLE terminal and providing a low voltage on the collector of PNP transistor Q2. In addition, the gate of N channel MOS transistor Q4 (whose substrate is held at the source voltage) is turned off thereby disconnecting the SPEAKER output terminal from the SP+ terminal, which is the terminal on which an incoming message is received. The message to be transmitted is received on terminal SP+ from the audio recorder (shown in FIG. 6) and is transmitted through blocking capacitor C18 to control lead 5 of timer and modulator chip 405. Typically, timer and modulator chip 405 is the well known LM555 timer chip available from, for example, National Semiconductor. The output signal from chip 405 is provided on output pin 3 and is sent to the base of PNP transistor Q2. The input signal to timer chip 405 is the recorded signal SP+ provided on input lead 5. Timer chip 405 produces on output lead 3 a high frequency signal (typically, about 175 KHz) the frequency of which is modulated by the amplitude of the incoming signal on terminal SP+. Thus the output frequency on lead 3 is a stream of pulses which have a substantially constant pulse width but the pulse frequency of which is modulated by the amplitude of the incoming signal on SP+. This output signal turns on and off PNP transistor Q2 thereby turning on and off infrared emitting diodes D8 and D9 at the frequency of the output pulses. Thus diodes D8 and D9 (which in one embodiment are diodes AN305 provided by Stanley Electric) generate an IR signal which represents the output signal on lead 3 from chip 405. This IR signal is transmitted in a directional manner to another like device at which the transmit window of the transmitting device is being pointed. The collector of PNP transistor Q2 is grounded thereby disabling the receiver (shown in FIG. 5). Moreover, the speaker in the device is also disabled by the turning off of NMOS switch Q4 thereby preventing the transmitted signal from being audible to the sender.

The transmitter circuit in FIG. 4 also includes LED D10 which turns on in response to a message being sent to tell the user that the message is being sent. This particular diode turns on in response to the recorded message being transmitted to the base of NPN transistor Q5 through base resistor R27. Transistor Q5 is turned on and off in respond to the audio signal being received by the transmitter on terminal SP+ and causes LED D10 to emit light in response to NPN transistor Q5 turning on and off in response to the received audio signal. Resistor R28 prevents a substantial flow of current through diode D10 and NPN transistor Q5. In reality transistor Q5 is on most of the time during the receipt of the signal on terminal SP+ causing LED D10 to transmit modulated light continuously telling the sender that, in fact, the sender must keep pointing the device because the message is still being transmitted.

The transmitter also is capable of indicating the receipt of an incoming message at the device from another device. An end of incoming message signal received on END OF INCOMING MESSAGE terminal is passed through blocking capacitor C20 to an oscillator including NAND gate 401 feedback resistor R20 and capacitor C21.

When an incoming message is received, initially, the signal on END OF INCOMING MESSAGE terminal goes low thereby driving the voltage on node A (which has been at ground level) beneath ground. Gradually, the voltage on node A comes back up to ground and sits at ground as long as the signal on the terminal END OF INCOMING MESSAGE is low. Then at the end of the incoming message, the signal on terminal END OF INCOMING MESSAGE goes high thereby driving the voltage on node A high for a short period of time until this voltage again is pulled back to ground through resistor R19. The voltage on node A is applied to NAND gate 401 on input lead 1 thereby enabling NAND gate 401. NAND gate 401 then functions as an oscillator at a frequency of about 800 Hz for the period of time that the voltage on node A remains high to enable NAND gate 401. This time is about 1 second. Naturally, this time can be varied by varying the value of resistor R19. Also the frequency of oscillation of the oscillator comprising NAND gate 401, resistor R20 and capacitor C21 can be varied by varying the value of resistor R20 and capacitor C21. The output oscillations from NAND gate 401 are driven on output lead 3 through blocking capacitor C22 to the speaker terminal thereby to activate the speaker and provide an audio signal or buzz for about 1 second.

The output signal on lead 3 from NAND gate 401 in oscillator 406 is also driven to input lead 4 on NAND gate 402. NAND gate 402 is cross-coupled in a well known manner with NAND gate 403 to form a latch circuit. The instant the output signal on lead 3 from NAND gate 401 goes low, the latch made up of cross-coupled NAND gates 402 and 403 produces a high output signal on lead 6 of NAND gate 402. This high output signal drives the output signal on lead 8 from NAND gate 403 low thereby disabling NAND gate 402 and preventing the oscillations on output lead 3 from NAND gate 401 from having any further effect on the latch circuit. The high level output signal on lead 6 from NAND gate 402 thus is provided on input lead 12 to NAND gate 404 thereby providing a low level output signal on output lead 11 to turn on PNP transistor Q3. LED D11 thus produces a visible output signal to the wearer of the device, telling the wearer that a message has been received. The low level output signal on lead 11 from NAND gate 404 is fed back through resistor R17 to discharge capacitor C19 thereby driving the input signal on input lead 13 to NAND gate 404 low. The time necessary for this to occur is typically about ¼ to ½ second. When the input signal on lead 13 goes low, the output signal of NAND gate 404 on output 11 goes high thereby shutting off transistor Q3. This high signal then charges capacitor C19 through resistor R17 and series connected resistor R18 and diode D6 in parallel with resistor R17. When the charge on capacitor C19 produces a high level signal on input lead 13, NAND gate 404 then produces a low output signal thus again turning on transistor Q3. A typical duty cycle for transistor Q3 is to be on for approximately ¼ to ½ second and off for about 1½ to 1¾ second. Thus, this particular oscillator 407 continues to oscillate until the wearer of the device presses the play button (see FIG. 6). When the play button is pressed, input lead 10 of NAND gate 403 goes low thereby switching the state of flip-flops 402 and 403 to provide a low signal on output lead 6 from NAND gate 402 thereby stopping oscillator 407 from oscillating.

The ratings of the components for a transmitter in one embodiment of this invention are listed in Table 1.

Figure 5:
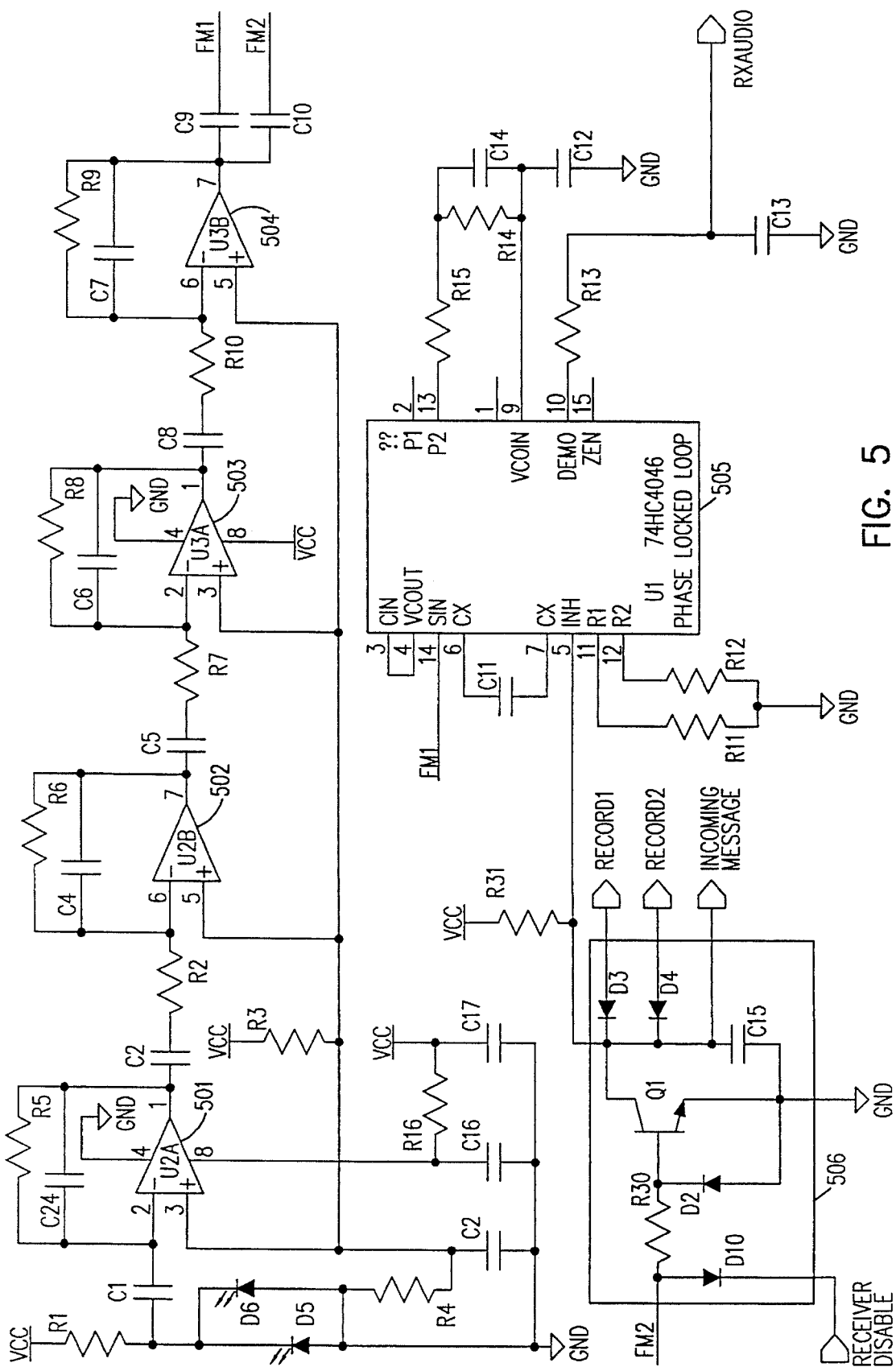
FIG. 5 is a circuit diagram of the infrared receiver of FIG. 3B.

FIG. 5 illustrates a receiver used in one embodiment of this invention. In FIG. 5, light sensitive diodes D5 and D6 (which in one embodiment are photodiodes PD638B provided by Everlight) receive the transmitted IR signal from another like device. Diodes D5 and D6 are back biased to lower their capacitances thereby to provide a faster response time to incident infrared radiation. The anodes of these diodes are connected to one terminal of resistor R1 the other terminal of which is connected to the voltage supply VCC.

The anodes of diodes D5 and D6 are also connected through blocking capacitor C1 to inverting input lead 2 on transimpedience amplifier 501. Amplifier 501 converts an input current to an output voltage. Input lead 3 is biased to be at approximately half of VCC by means of a voltage-divider made up of resistors R3 and R4. An off switch (not shown) can be provided in the circuit to shut off all current to all components in the device when the device is not in use to prevent unwanted battery drain. Capacitor C3 in connection with resistors R3 and R4 functions as a filter preventing noise from impacting the circuit. The output of inverting transimpedience amplifier 501 is provided through blocking capacitor C2 and resistor R2 to input lead 6 on inverting amplifier 502 (a voltage-to-voltage amplifier) and then from output lead 7 of inverting amplifier 502 through blocking capacitor C5 and resistor R7 to inverting input lead 2 of inverting amplifier 503. The signal on output lead 1 from inverting amplifier 503 is passed through blocking capacitor C8 and resistor R10 to inverting lead 6 on inverting amplifier 504. The output signal on output lead 7 from inverting amplifier 504 is passed through blocking capacitor C9 and C10 in parallel on output leads FM1 and FM2 which go respectively to the FM1 input lead 14 on phase locked loop block 505 and to the input terminal FM2 on a signal detection circuit 506.

Phase locked loop 505 is basically a demodulator which demodulates the pulse frequency modulated signal received by diodes D5 and D6 into an audio signal which is then transmitted from phase locked loop 505 on demodulator output pin 10. This signal is then transmitted on RX AUDIO terminal to the recording structure which will be described later in FIG. 6. Phase locked loop 505 is a standard commercial component such as Signetics Part No. 74HC4046. This part is also made, or has been made by a number of manufacturers including RCA and Motorola. The various resistors such as R11, R12, R13, R14 and R15 and capacitors such as C11 and C14 shown associated with this part serve functions as described in the data sheet for this part. These functions are well known and thus will not be described in detail.

The signal on lead FM2 is input to disable/enable circuit 506. Circuit 506 includes diodes D10, D2, D3 and D4, resistor R30, NPN transistor Q1 and capacitor C15. When an AC signal is present on lead FM2, diode D2 will clip the negative portions of the signal and allow the positive portions of the signal to turn on transistor Q1. Transistor Q1 when turned on pulls the voltage on capacitor C15 to approximately zero thereby producing a low level signal on terminals RECORD 1 and RECORD 2 and INCOMING MESSAGE. Thus, the disable/enable circuit 506 enables the recording of the incoming message and, as described above in conjunction with FIG. 4, provides, at the end of the incoming message, a signal indicating that a message has been received. When the incoming message ends, FM2 no longer is present as an AC signal. If however, the transmitter associated with the device at which the receiver is present, is transmitting, the receiver disable signal will be low pulling FM2 low through diode D10. Pulling FM2 low through diode D10 shuts off transistor Q1 and prevents RECORD 1, RECORD 2 and INCOMING MESSAGE terminals from going low thereby disabling the recording functions during the transmission of a signal as well as inhibiting phase locked loop circuit 505 by providing a high signal on input pin 5 labelled "INH".

The ratings of components for a receiver in one embodiment of this invention are listed in Table 1.

Figure 6A:
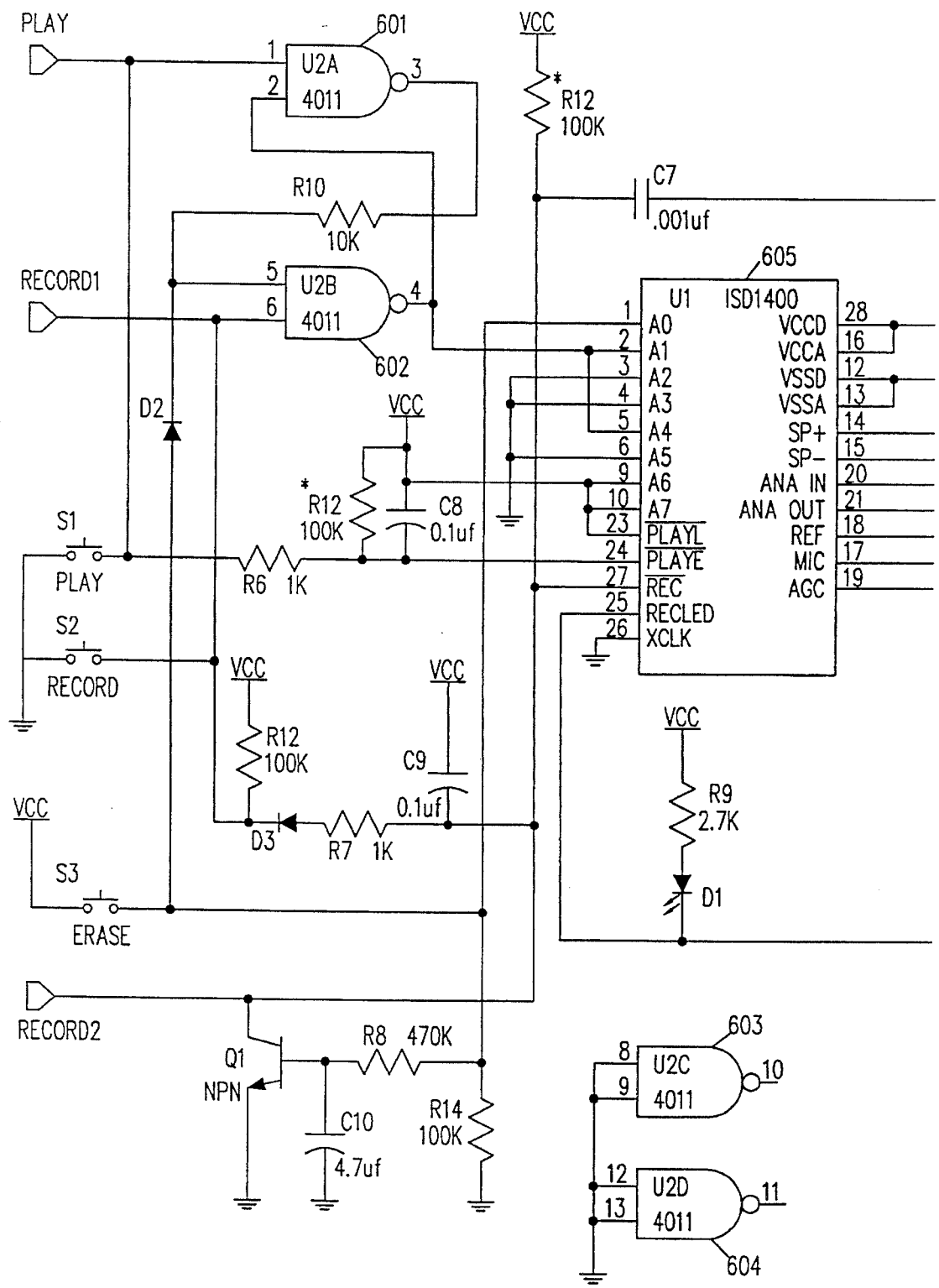
FIG. 6 is a circuit diagram of the audio recorder of FIG. 3B.
Figure 6B:
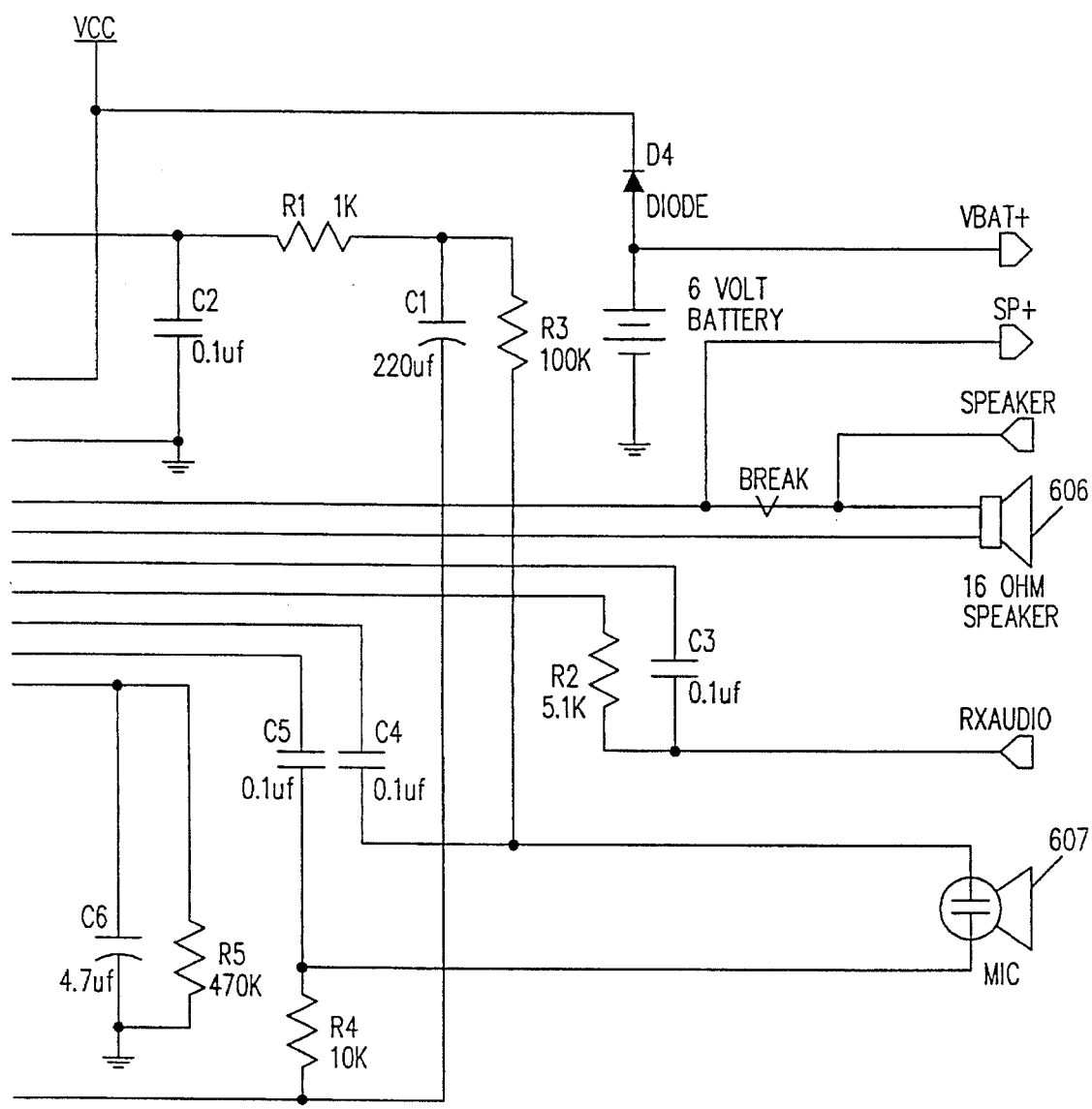

FIG. 6 illustrates an audio recorder associated with one embodiment of a communication device in accordance with this invention. The heart of FIG. 6 is the integrated circuit 605 which in one embodiment is the analog recorder chip ISD 1400 as described above. The ISD 1400 will store and record up to 20 seconds of analog signal. Other recording devices can, of course, be used with this invention if desired and the appropriate circuitry for use with these devices will be well within the skill of one skilled in the art given this disclosure. Such other recording devices could include, for example, a small wire recorder.

When a message is to be recorded, switch S2 is pressed thereby pulling the voltage on the RECORD 1 terminal to ground. This pulls low the input lead 6 to NAND gate 602 (cross-coupled in a well known manner with NAND gate 601 to form a latch), thus driving the output signal on output lead 4 from NAND gate 602 high. The input signal on the PLAY terminal which is connected to input terminal 1 of NAND gate 601 is already held high by VCC applied to this terminal through series connected resistors R13 and R6. Thus, the high output signal on output lead 4 of NAND gate 602 drives the output signal on output lead 3 from NAND gate 601 low thereby applying a low input signal on input lead 5 to NAND gate 602 and disabling NAND gate 602. The high output signal on output lead 4 from NAND gate 602 is provided on input pin 2 to recording chip 605 and also on input pin 5 to chip 605.

In addition, the low record signal resulting from pushing switch S2 is passed through diode D3 and resistor R7 to record input lead 27 of chip 605 thereby to initiate the recording process. The input signal to be recorded when the signal is being generated by the user of the device will come from the microphone 607 into terminals 17 and 18 through blocking capacitors C4 and C5.

When a signal is being received by the receiver (FIG. 5) as described above, the signals on terminals RECORD 1 and RECORD 2 will also go low. These signals will likewise activate the recording in audio recorder chip 605 so that the received demodulated signal on terminal RX AUDIO from FIG. 5 will be received on terminal RX AUDIO of FIG. 6 and recorded by audio recorder chip 605 as a result of signals transmitted into this device mainly on pin 20 through blocking capacitor C3. In addition, a small signal is transmitted into chip 605 through resistor R2 on pin 21.

During the playback of a signal, the PLAY switch S1 is pressed thereby dropping the input lead 1 of NAND gate 601 low and driving output lead 3 of NAND gate 601 high. This high output signal is applied to input lead 5 to NAND gate 602. The other input lead 6 of NAND gate 602 is connected to RECORD. If switch S2 is open and there is no RECORD 1 signal low indicating no message being received, then input lead 6 contains a high signal. Thus the output lead on NAND gate 602 goes low thereby providing a low input lead into the analog recorder chip 605 on pins 2 and 5. This then allows the message recorded in analog recorder 605 to be played. The output signal is transmitted from analog recorder on SP+ and SP− pins 14 and 15, respectively, to the speaker 606 and/or to SP+. When the signal is to be transmitted to another device, SP+ is open circuited to the speaker 606 thereby preventing the speaker from playing while the message is being transmitted. When, however, the signal is not to be transmitted but merely to be heard, speaker 606 receives the recorded signal and provides an audio message to the listener. NAND gates 603 and 604 are not used but come with the NAND gates 601 and 602 in a four pack.

LED D1 lights up while analog recorder chip 605 is recording.

NPN transistor Q1 is part of the erase circuit. When erase switch S3 is pressed, the voltage on the base of Q1 is driven high thereby turning on NPN transistor Q1 which is connected to pin 27 of analog recorder chip 605. This causes the analog recorder chip 605 to be erased immediately. Even though recorder chip 605 can hold, for example, up to 20 seconds of recorded message, the time required to erase this material is quite short being only a fraction of a second when Q1 turns on. Resistors RS, R14 and capacitor C10 are provided to insure that accidental erase does not occur when button S3 is touched for just an instant. Capacitor C10 takes a fraction of a second to charge before transistor Q1 turns on to insure that any pressing of switch S3 is deliberate rather than accidental.

The automatic gain control circuit 19 which has resistor R5 connected in parallel with capacitor C6 between input lead 19 and ground serves the function described in the data sheet of ISD 1400 by providing automatic gain control to the recorded message.

Battery is connected to VCC through diode D4 to cut the voltage from 6 volts to about 5.2 or 5.3 volts which is applied to chip 605.

The ratings of components for an audio recorder in one embodiment of this invention are identical to the ratings listed in the ISD 1400 data sheets. The ratings of components for an audio recorder in one embodiment of this invention are listed in Table 2.

ISD recorder chip 1400 used in one embodiment of this invention is based on Direct Analog Storage Technology (DAST) as described in U.S. Pat. No. 4,890,259, entitled "High Density Integrated Circuit Analog Signal Recording and Playback System", U.S. Pat. No. 4,989,179, entitled "High Density Integrated Circuit Analog Signal Recording and Playback System", U.S. Pat. No. 5,220,531, entitled "Source Follower Storage Cell and Improved Method and Apparatus for Iterative Write and Integrated Circuit Analog Signal Recording and Playback", U.S. Pat. No. 5,126,967, entitled "Writable Distributed Non-Volatile Analog Reference System and Method for Analog Signal Recording and Playback" and U.S. Pat. No. 5,241,494, entitled "Integrated Circuit System and Method for Analog Signal Recording and Playback".

One advantage of using an analog recorder chip 605 in a device of this invention is the elimination of digital sampling of sound and digital storage of the sound because in analog recorder chip 605 the message is recorded in the memory in direct analog form without digitization and compression. Moreover, all recordings on analog recorder chip 605 are stored in onboard non-volatile memory cells, providing zero-power message storage due to DAST. Another advantage of using a solid-state chip 605 to store sounds instead of a conventional audio tape recorder is that there are no moving parts. Moreover, solid-state chip 605 has size, weight and cost advantages over a conventional audio tape recorder. The automatic gain control circuit of analog recorder chip 605 allows the full range of whispers to loud sounds to be recorded with minimal distortion. Therefore analog recorder chip 605 provides a very true, natural sounding reproduction of voice, music, tones, and sound effects. A message stored in analog recorder chip 605 can be played as often as desired. Also, any message stored in analog recorder chip 605 can be retained for up to 100 years without power.

The communication device of this invention has several modes of operation; namely record, transmit a recorded message to another communication device, play a recorded message and receive and record a message transmitted from another communication device as described above. In the record mode, a message with optional sound effects can be recorded by the user. Using the play mode, the recorded message can be played back as often as desired. Using the transmit mode, a recorded message can be transmitted to a remote user of a like device. Similarly, a message from a remote device can be received and recorded. A received and recorded message can be listened to by the user at any convenient time, using the play mode. Recording of an incoming message is disabled during the transmission of a message.

In the above embodiment, a single memory is used for recording a message to be transmitted as well as for recording an incoming message. Therefore an incoming message can garble a message being recorded by the user. Also, a second incoming message can overwrite a message received earlier. Finally, a user can retransmit a received message. In some embodiments, separate areas of memory or separate memories can be used for messages to be transmitted and for incoming messages so that various messages do not over write each other. In some embodiments, a microprocessor or a logic chip can be used to control addressable memory, segmenting one or more registers for receiving and one or more registers for transmitting messages.

Although in one embodiment of this invention (as shown in FIG. 6) the battery voltage is 6 volts, a communication device 3 can be powered by any voltage, such as two AAA type batteries (see, for example, device 3C of FIG. 2F). Although only two photoreceptor diodes and two infrared emitter diodes are shown in some embodiments, any reasonable number of photoreceptor diodes and infrared emitter diodes can be used in accordance with this invention. Furthermore, the photoreceptor diodes can be mounted at various points in order to obtain a wider coverage in both transmitting and receiving messages.

While one embodiment of this invention has been described, other embodiments of this invention will be obvious those skilled in the art in the view of this description. For example, instead of infrared signals, radio frequency (RF) signals can be used in accordance with this invention. Moreover, instead of pulse frequency modulation circuitry and method described for one embodiment, any other modulation such as, for example, amplitude modulation, can be used in accordance with this invention. The broad scope of this invention is to be limited only by the appended claims.

TABLE 1

| Reference | Description | Package | Vendor |
| --- | --- | --- | --- |
| C1, C9 | Capacitor, 0.001 µf, 10% | 0805 | SMD/Calchip |
| C3, C15, C16, C17, C20, C22 | Capacitor, 0.1 µf, 10% | 0805 | SMD/Viltramon |
| C4, C6, C7 | Capacitor, 3 pf, 5% | 0805 | SMD/Calchip |
| C2, C5, C8 | Capacitor, 100 pf, 5% | 0805 | SMD/Calchip |
| C11 | Capacitor, 820 pf, 5% | 0805 | SMD/Calchip |
| C10, C13 | Capacitor, 0.01 µf, 10% | 0805 | SMD/Calchip |
| C12 | Capacitor, 0.033 µf, 10% | 0805 | SMD/Calchip |
| C14 | Capacitor, .003 µf, 10% | 0805 | SMD/Calchip |
| C18 | Capacitor, .22 µf, 10% | 1206 | SMD/Calchip |
| C19 | Capacitor, 0.22 µf, 20% | 1206 | SMD/Viltramon |

TABLE 1-continued

| Reference | Description | Package | Vendor |
|---|---|---|---|
| C21 | Capacitor, 0.005 μf, 10% | 1206 | SMD/Calchip |
| C23 | 220 pf | 1206 | SMD/Calchip |
| D1, D2, D3, D4, D6, D7 | Diode, 1N4148 | SOD80 | SMD/Rohm |
| D5 | Photo diode, PP601-2 | SOD80 | Everlight |
| D8, D9 | IR Diode, #AN305 | SOD80 | Stanley |
| D10 | LED, Green, MBR030 | T2 | Everlight |
| D11 | LED, Yellow, #264YD/T2 | T2 | Everlight |
| Q1, Q5 | Transistor, 2N3904 | SOT23 | SMD/Samsung |
| Q2, Q3 | Transistor, 2N3906 | SOT23 | SMD/Samsung |
| Q4 | Mosfet Transistor, BS170 | SOT23 | Zetex |
| R1, R2, R3, R4, R7, R10, R13, R22, R30 | Resistor, 10KΩ | 0805 | SMD |
| R5, R6, R8, R9 | Resistor 200KΩ | 0805 | SMD |
| R11 | Resistor, 180KΩ | 0805 | SMD |
| R12, R31 | Resistor, 47KΩ | 0805 | SMD |
| R14 | Resistor 1.2KΩ | 0805 | SMD |
| R15 | Resistor, 470Ω | 0805 | SMD |
| R16 | Resistor, 47Ω | 0805 | SMD |
| R17 | Resistor, 2.2MΩ | 0805 | SMD |
| R18 | Resistor, 470KΩ | 0805 | SMD |
| R19 | Resistor, 10MegΩ | 0805 | SMD |
| R20 | Resistor, 270KΩ | 0805 | SMD |
| R21, R24 | Resistor, 2.4KΩ | 0805 | SMD |
| R23 | Resistor, 24Ω | 1206 | SMD |
| R25 | Resistor, 12KΩ | 0805 | SMD |
| R26 | Resistor, 15KΩ | 0805 | SMD |
| R27 | Resistor, 4.7KΩ | 0805 | SMD |
| R28 | Resistor, 2.7KΩ | 0805 | SMD |
| SW1 | Dome switch, 8 mm × .1 mm | | Nabob |
| U1 | 74HC4046AM I.C. | 16 SOP | Arrow/Harris |
| U2, U3 | LF353 Op Amp | 8 SOP | Marshall/T.I. |
| U4 | 74HC132 | 14 SOP | Millgray/SGS |
| U5 | LM555C | 8 SOP | Millgray/SGS |

TABLE 2

| Reference | Description | Package | Vendor |
|---|---|---|---|
| C1 | Capacitor, 220 μf | 1206 | SMD |
| C2, C3, C4, C5 | Capacitor, 0.1 μf | 1206 | SMD |
| C6, C10 | Capacitor, 4.7 μf | 1206 | SMD |
| C7 | Capacitor, 0.001 μf | 1206 | SMD |
| C8, C9 | Capacitor, 0.1 μf | 1206 | SMD |
| D1 | LED #264HD/T2 | Bipin | Everlight |
| D2, D3, D4 | Diode 1N4148 | SOD80 | SMD |
| Q1 | Transistor, NPN 2N3904 | SOT | SMD |
| R1 | Resistor, 1K | 0805 | SMD |
| R2 | Resistor, 5.1 | 0805 | SMD |
| R3, R4 | Resistor, 10K | 0805 | SMD |
| R5, R8 | Resistor, 470K | 0805 | SMD |
| R6, R7 | Resistor, 1K | 0805 | SMD |
| R9 | Resistor, 1.7K | 0805 | SMD |
| R10, R11 | Resistor, 10K | 0805 | SMD |
| R12, R13, R14 | Resistor, 100K | 0805 | SMD |

What is claimed is:

1. A bi-directional wireless portable communication device comprising:

a portable housing;

a plurality of user operable switches mounted in said portable housing, said plurality of user operable switches including a record switch, a transmit switch and a play switch;

a sound input transducer mounted in said portable housing;

an integrated circuit comprising memory, mounted in said portable housing, coupled to said sound input transducer and coupled to said record switch, wherein, in response to activation of said record switch, said integrated circuit stores electrical signals from said sound input transducer in direct analog form in said memory, said electrical signals being representative of audio signals;

a wireless transmitter, mounted in said housing, coupled to said memory and coupled to said transmit switch, wherein, in response to activation of said transmit switch, said wireless transmitter transmits electromagnetic signals representative of said electrical signals stored in said memory;

a wireless receiver, mounted in said housing and coupled to said memory, wherein, said wireless receiver receives electromagnetic signals, said electromagnetic signals being representative of audio signals; and further wherein said integrated circuit stores electrical signals from said wireless receiver in said memory while said record switch is deactivated; and a sound output transducer, mounted in said housing, coupled to said memory and to said play switch, wherein, in response to activation of said play switch, said sound output transducer generates sound waves representative of said electrical signals stored in said memory.

2. The bi-directional wireless portable communication device of claim 1 wherein said memory is capable of storing a plurality of selected pre-recorded sounds; said bi-directional wireless portable communication device further comprising a plurality of sound effect switches coupled to said memory, wherein on activation of a sound effect switch, said bi-directional wireless communication device adds to a message at least one of said selected pre-recorded sounds.

3. The bi-directional wireless portable communication device of claim 1 further comprising a message indicator for indicating the receipt of a message by said wireless receiver.

4. The communication device of claim 1 further comprising a housing, said housing having a grille for said sound input transducer, and said housing having an opening for said sound output transducer.

5. The bi-directional wireless portable communication device of claim 1 wherein said portable housing has the shape of a pen.

6. A communication system comprising a plurality of bi-directional wireless portable communication devices of claim 1, wherein at least one bi-directional wireless portable communication device of said plurality is capable of receiving an infrared signal transmitted by another bi-directional wireless portable communication device of said plurality.

7. A bi-directional wireless portable communication device comprising:

an audio recorder circuit comprising a first input terminal, a second input terminal, and an output terminal, wherein, in response to an active signal on said second input terminal, said audio recorder circuit stores an electrical signal received on said first input terminal; and further wherein said audio recorder circuit supplies said stored electrical signal on said output terminal;

a wireless infrared receiver circuit comprising an input terminal, a first output terminal coupled to said first input terminal of said audio recorder circuit, a second output terminal coupled to said second input terminal of said audio recorder circuit, and a third output terminal, wherein, in response to an infrared signal at a predetermined frequency, and an inactive signal on said input terminal, said wireless infrared receiver circuit supplies an electrical signal representative of said infrared signal on said first output terminal and simultaneously drives a control signal active on said second output terminal, and further wherein, when said infrared signal goes inactive, said wireless receiver drives a signal active on said third output terminal;

a wireless infrared transmitter circuit comprising a first input terminal coupled to said third output terminal of said wireless infrared receiver, a second input terminal coupled to said output terminal of said audio recorder circuit, an output terminal coupled to said input terminal of said wireless infrared receiver, and a transmit switch, wherein, in response to closure of said transmit switch, and an inactive signal on said wireless infrared transmitter input terminal, said wireless infrared transmitter drives a signal on said wireless infrared transmitter first output terminal active and transmits an infrared signal at said predetermined frequency, said infrared signal being representative of an electrical signal received on said wireless infrared transmitter second input terminal.

8. A communication system comprising a plurality of bi-directional wireless portable communication devices of claim 7, wherein at least one bi-directional wireless portable communication device of said plurality is capable of receiving an infrared signal transmitted by another bi-directional wireless portable communication device of said plurality.

* * * * *